United States Patent
Rosset et al.

(10) Patent No.: US 7,032,109 B1
(45) Date of Patent: Apr. 18, 2006

(54) METHOD AND SYSTEM FOR ENSURING THE SECURITY OF SERVICE SUPPLIES BROADCAST ON A COMPUTER NETWORK OF THE INTERNET TYPE

(75) Inventors: Franck Rosset, Paris (FR); Alain Gayet, Courbevoie (FR); Jean Moulin, Draveil (FR)

(73) Assignee: Fintel S.A., Paris (FR)

( * ) Notice: Subject to any disclaimer, the term of this patent is extended or adjusted under 35 U.S.C. 154(b) by 0 days.

(21) Appl. No.: 09/269,080

(22) PCT Filed: Sep. 25, 1997

(86) PCT No.: PCT/FR97/01685

§ 371 (c)(1),
(2), (4) Date: May 3, 1999

(87) PCT Pub. No.: WO98/13984

PCT Pub. Date: Apr. 2, 1998

(30) Foreign Application Priority Data

Sep. 25, 1996  (FR) .......................................... 96 11912

(51) Int. Cl.
*G06F 15/28* (2006.01)

(52) U.S. Cl. ...................... 713/151; 379/123; 379/130; 379/144.05; 380/277; 705/39

(58) Field of Classification Search ............ 379/144.05, 379/144, 123, 130; 713/151; 380/277; 705/39
See application file for complete search history.

(56) References Cited

U.S. PATENT DOCUMENTS

| | | | |
|---|---|---|---|
| 4,339,798 A | | 7/1982 | Hedges et al. |
| 4,707,592 A | | 11/1987 | Ware |
| 4,928,098 A | | 5/1990 | Dannhaeuser |
| 4,991,169 A | * | 2/1991 | Davis et al. .................. 370/77 |

(Continued)

FOREIGN PATENT DOCUMENTS

| | | |
|---|---|---|
| CA | 2 085 775 | 6/1994 |
| DE | 43 25 459 | 2/1995 |

(Continued)

OTHER PUBLICATIONS

Confalone, D.E., Rogers, B.W. and Thornberry, R.J. Jr., 'Calling Card Service—TSPS Hardware, Software, and Signaling Implementation', *Bell System Technical Journal* (1982), vol. 61, pp. 1675–1713.

(Continued)

*Primary Examiner*—Emmanuel L. Moise
*Assistant Examiner*—Taghi T. Arani
(74) *Attorney, Agent, or Firm*—Merchant & Gould P.C.

(57) ABSTRACT

The invention concerns a method and a system enabling users (11) of an Internet type computer network provided with multimedia terminals (16) comprising a microphone (17) and connected to an Internet type computer network (15), remotely located from a service supplier (12), to accede rapidly and safely, to services (30) offered by this service supplier (12). The method comprises the following steps: the service supplier (12) provides each of the users (11) of an Internet type computer network (15) who have subscribed to his services (30), a card, formatted like a credit card; said card (10), formatted like a credit card, emits brief identifying sound signals (20), of the DTMF type, at least partly encrypted, varying with each operation, when it is actuated (14) by the user (11); said identifying sound signals are received by the microphone (17) of the multimedia terminal (16) and transmitted via the Internet type computer network (15) to the computer service (18) of the service supplier; the transmitted signals and the identification data of the subscriber and the card in the possession (23) of the computer service (18) are electronically processed (24) and compared (25) by the computer service. In the event of coincidence, the subscriber is immediately put through to the services (30) of the service supplier (12).

12 Claims, 3 Drawing Sheets

U.S. PATENT DOCUMENTS

| | | | |
|---|---|---|---|
| 4,998,279 A | | 3/1991 | Weiss |
| 5,136,632 A | | 8/1992 | Bernard |
| 5,239,583 A | | 8/1993 | Parrillo |
| 5,265,162 A | | 11/1993 | Bush et al. |
| 5,317,636 A | | 5/1994 | Vizcaino |
| 5,392,336 A | | 2/1995 | Chang et al. |
| 5,406,619 A | * | 4/1995 | Akhteruzzaman et al. .... 379/95 |
| 5,448,638 A | | 9/1995 | Johnson et al. |
| 5,497,373 A | * | 3/1996 | Hulen et al. .................. 370/79 |
| 5,583,933 A | * | 12/1996 | Mark ......................... 379/355 |
| 5,594,798 A | * | 1/1997 | Cox et al. ..................... 380/49 |
| 5,633,920 A | | 5/1997 | Kikinis et al. |
| 5,657,378 A | * | 8/1997 | Haddock et al. ......... 379/93.23 |
| 5,737,421 A | | 4/1998 | Audebert |
| 5,790,644 A | | 8/1998 | Kikinis |
| 5,802,150 A | * | 9/1998 | Beck et al. ................... 379/93 |
| 5,802,176 A | | 9/1998 | Audebert |
| 5,818,937 A | | 10/1998 | Watson |
| 5,907,597 A | * | 5/1999 | Mark ...................... 379/93.03 |
| 5,963,643 A | * | 10/1999 | Goreta et al. ................... 380/9 |
| 6,144,848 A | | 11/2000 | Walsh et al. |
| 6,377,670 B1 | * | 4/2002 | Rosset et al. .......... 379/144.05 |
| 6,675,507 B1 | | 1/2004 | Petruzzelli |

FOREIGN PATENT DOCUMENTS

| | | |
|---|---|---|
| EP | 0 360 732 | 3/1990 |
| EP | 0 374 012 | 6/1990 |
| EP | 0 423 035 | 4/1991 |
| EP | 0 459 781 | 12/1991 |
| EP | 0 609 143 | 8/1994 |
| EP | 0 695 076 | 1/1996 |
| GB | 2 274 523 | 7/1994 |
| JP | 63-211843 | 9/1988 |
| WO | WO 82/04169 | 11/1982 |
| WO | WO 88/03294 | 5/1988 |
| WO | WO 96/04741 | 2/1996 |
| WO | WO 96/31971 | 10/1996 |
| WO | WO 97/03421 | 1/1997 |
| WO | WO 97/12471 | 4/1997 |

OTHER PUBLICATIONS

Basinger, R.G., Berger, M., Prell, E.M., Ransom, V.L., and Williams, J.R. 'Calling Card Service—Overall Description and Operational Characteristics', *Bell System Technical Journal* (1982), vol. 61, pp. 1655–1673.

Chung, Edward C. and Celenk, M., 'Implementation of a Fax Distribution System in the Local Area Networks of PCs', (periodical unknown), (1992), pp. 964–968.

* cited by examiner

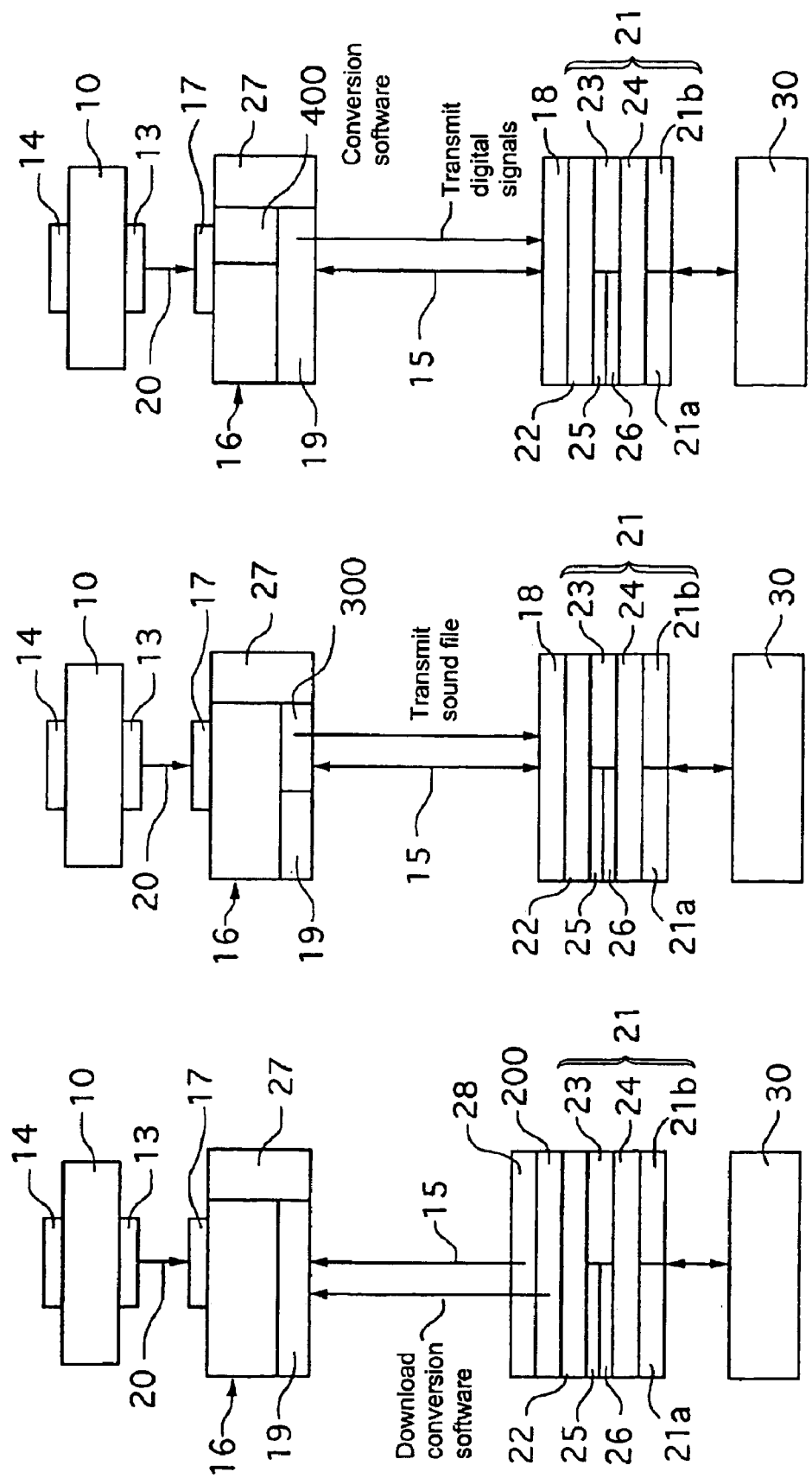

METHOD AND SYSTEM FOR ENSURING THE SECURITY OF SERVICE SUPPLIES BROADCAST ON A COMPUTER NETWORK OF THE INTERNET TYPE

The field of the invention is that of data transmission on an internet-like computer network.

More precisely, the invention relates to a method and system enabling the users of an internet-like computer network, who have multimedia terminals with a microphone and are connected to an internet-like computer network, located at a distance from a service provider, to access securely and rapidly the services that this service provider offers to his subscribers by means of an internet-like computer network.

The problem at hand is to prevent a malicious user from accessing the services offered by the service providers without being authorized to do so, without paying the corresponding fee or by pretending that he did not ask for the services he is debited for.

To solve this problem, it has been proposed to use access keys that the user generates by means of his multimedia terminal or by means of peripherals. In addition to their cost, these solutions are not very convenient and lengthy to implement. In fact, the problem at hand can be solved effectively only if one is capable of solving another problem at the same time: design a convenient to use method and system, fast to implement and economical. Indeed, from the moment a large audience is addressed, ease of use and time savings become major problems that cannot be dismissed.

It has been proposed (document WO 96 04741 on behalf of Andrew MARK) to use a card issuing encrypted audio signals, of DTMF type, for dialing phone numbers. Thus, the bearer of such a card, by coupling it to the handset microphone, automatically transfers his identifiers. As these identifiers are encoded, it can be believed that a third party will not be able to understand the contents.

Therefore, A. MARK's solution relates to a totally different technical field than that of the security of data transmitted on an internet-like computer network. Moreover, it is still possible to record the signals issued by the A. MARK card and a swindler having this recording can replace the beneficiary of the card. Therefore, the A. MARK card would not prevent a malicious user to access, without being authorized to do so, the services offered on internet-like computer networks.

The patent application DE A 325 459, filed on behalf of Raymund H. EISELE, describes a pocket calculator issuing ID audio signals, varying for each transaction. A recording of such audio signals would therefore be of no interest for a swindler. However, its big dimensions, poor ease of use, difficult usage and high cost price do not allow reaching the objectives aimed at by the present invention. I.e.: design a convenient to use method and system, fast to implement and economical. Indeed, a user would only accept to make use of the services offered by a service provider on an Internet-like computer network if the access thereto is easy and fast.

The objectives aimed at by the present invention are achieved and the problems posed by the techniques according to prior art are solved, according to the invention, using the following method:

the service provider supplies to each of the users of an internet-like computer network, who have subscribed to his services, a credit-card sized card, customized with specific identifiers for each subscriber and each card, said credit-card sized card issues short ID audio signals, of DTMF type, encrypted at least partially, varying for each transaction, when it is activated by the user of an internet-like computer network, said ID audio signals are received through the microphone of the multimedia terminal and transmitted via the internet-like computer network to the computer facility of the service provider, namely after the multimedia terminal has received a transmission order issued by the computer facility, the signals transmitted and the ID data of the customer and the card held by the computer facility are processed and compared electronically by the computer facility of the service provider, so that in case of a match, the subscriber can immediately be put through to the computer server of the service provider.

Thus, thanks to this method, the service provider is sure that the caller actually has an authentic card and not an electronic mock-up. He could also identify the card holder as being a person authorized to use the services he offers. In addition, swindlers do not have the possibility to steal the ID data as they are transmitted automatically in an encrypted form. Furthermore, the recording, whatever form it may be in, of the audio signals will be of no use to a swindler for obtaining identification by the electronic services of the service provider. Indeed, the ID audio signals vary for each transaction. I.e., each time the card is activated.

Preferably, said card:
furthermore counts the number of times $C(p,n)$ it is activated,
issues audio signals representative of the number of times $C(p,n)$ it has been activated,
encrypts the audio signals depending on the number of times $C(p,n)$ it has been activated.

Also preferably, said computer means for electronically processing and comparing the signals transmitted and the ID data of the customer and the card held by the computer facility of the service provider:

store the number of times $C(p,m)$ the card has been activated during the last transaction validated,
compare the number of times $C(p,n)$ the card has been activated, during the current transaction, to the number of times stored N1,
reject the current transaction if $C(p,n)$ is less than or equal to $C(p,m)$ and continue the verification of the current transaction if $C(p,n)$ is greater than $C(p,m)$,
recalculate the electronic signals $S'(p,n)$ depending on the ID data and the number of times $C(p,n)$ the card has been activated, during the current transaction, then compare them to the electronic signals $S(p,n)$ transmitted. Consequently, in case of a match, the subscribed user can immediately be put through to the services of the service provider.

It will be noted that using a microcircuit for encryption, by means of a counter, the ID codes exchanged between a transmitter and a receiver, has been described in the patent application: EP 0 459 781 A1 filed on behalf of NANOTEK LIMITED.

In view of increasing the security of the method, in an alternative embodiment, the method further comprises the following step: the subscriber issues a confidential code using a keyboard linked to the multimedia terminal and/or the card. After transmission to the computer facility of the service provider, via the computer communication network, this confidential code is processed and compared to the subscriber's personal confidential code held by the computer facility of the service provider.

Thus, the service provider is sure that the caller actually is the person authorized to get in touch with his services. A stolen card cannot be used by the thief because he does not known the confidential code.

In another alternative embodiment, also in view of reinforcing the security of the method and avoiding that the subscriber can question the request he has sent to the service provider, the method further comprises the following steps:

the orders the subscriber placed with the service provider are validated by the subscriber activating the card so that it issues an encrypted validation audio signal, said validation signal is recorded by the computer facility of the service provider, processed and decrypted, and preferably an acknowledgement of receipt is sent to the subscriber.

Thanks to this method, the subscriber has validated, with an electronic signature, the order he has placed with the service provider.

At least three alternative embodiments allow transmitting ID audio signals to the computer facility of the service provider.

According to the first alternative, the method according to the invention further comprises the following steps:

the computer facility of the service provider downloads conversion software to the multimedia terminal, the conversion software converts, in the form of a bit sequence, the ID audio signals received through the microphone of the multimedia terminal, the bit sequence is transmitted, via the internet-like computer network, to the computer facility of the service provider, namely upon receipt of a transmission order issued by the computer facility.

Consequently, the signals from the multimedia terminal appear as a bit sequence.

According to the second alternative embodiment, the ID audio signals received through the microphone of the multimedia terminal are transmitted via the internet-like computer network to the computer facility of the service provider, namely when the multimedia terminal has received a transmission order issued by the computer facility. In the case of this alternative, the signals from the multimedia terminal are transmitted in the form of a sound file. The processing of the sound file and its conversion into a bit sequence (binary elements) are carried out by the computer facilities of the service provider.

According to the third alternative, the method further comprises the following steps:

the service provider supplies to each of the users of the internet-like computer network, who have subscribed to his services, a conversion software to be implemented in the multimedia terminal, said ID audio signals received through the microphone of the multimedia terminal are converted into a bit sequence, before being transmitted via the internet-like computer network to the computer facility of the service provider.

The invention also relates to a system enabling the users of the internet-like computer network who have multimedia terminals with a microphone and are connected to an internet-like computer network, located at a distance from a service provider, to access securely and rapidly the services that said service provider offers to the users. This system is characterized in that it comprises the means for implementing the above defined method and its alternative embodiments.

More in particular:

The system according to the invention comprises a credit-card sized card customized with specific identifiers for each card and each subscriber, supplied to them. Said card comprises:

a means for issuing short ID audio signals, of DTMF type, activated by the subscriber by means of an element accessible from outside the card, an encryption means for encrypting at least partially and varying the audio signals each time the card is activated.

The system according to the invention comprises a means for transmitting audio signals, located inside the multimedia terminals, remote transmitting said audio signals in the form of electronic signals via the internet-like computer network.

The system according to the invention comprises a computer means, part of the computer facility of the service provider, connected to the internet-like computer network and receiving the electronic signals from the multimedia terminals. The computer means comprises:

a database containing the references of the cards and the subscribers and their ID data, a means for processing and a means for comparing the electronic signals and the ID data contained in the database.

Consequently, in case of a match, the services of the service provider are immediately accessible to the subscribers.

Thus, thanks to this system, the service provider is sure that the caller actually has an authentic card and not an electronic mock-up. He could also identify the card holder as being a person authorized to use the services he offers. In addition, swindlers do not have the possibility to steal the ID data as they are transmitted automatically in an encrypted form. Furthermore, the recording, whatever form it may be in, of the audio signals will be of no use to a swindler for obtaining identification by the computer facilities of the service provider. Indeed, the ID audio signals vary for each transaction. I.e., each time the card is activated.

Preferably, said card further comprises:

an incremental counter interconnected with the issuing means and the encryption means, incrementing at least by one unit each time the card is activated.

Consequently, the status of the incremental counter is issued to the computer means and the audio signals are encrypted depending on the status of the incremental counter.

Also preferably, said computer means further comprises:

a means for storing the status $C(p,m)$ of the incremental counter during the last transaction validated, a means for comparing the status $C(p,n)$ of the incremental counter, issued during the current transaction, to the stored status $C(p,m)$ of the incremental counter.

Consequently, the verification of the current transaction is rejected if $C(p,n)$ is less than or equal to $C(p,m)$ and continues if $C(p,n)$ is strictly greater than $C(p,m)$.

Also preferably, said processing means and said means comparing the electronic signals and the ID data contained in the database comprise a means for recalculating the electronic signals depending on the status $C(p,n)$ of the incremental counter and the ID data, then comparing them to the electronic signals transmitted. Consequently, in case of a match, the subscriber can immediately be put through to the service provider's services.

In view of increasing the security of the system, in an alternative embodiment, the system further comprises a second means for comparing a subscriber's personal confidential code, contained in the database, to a confidential code issued by the subscriber. This code is issued by means of a keyboard linked to the multimedia terminal and/or the card and transmitted to the computer means of the service provider, via the computer communication network.

Thus, the service provider is sure that the caller is actually the person authorized to get in touch with his services. A stolen card cannot be used by the thief because he does not know the confidential code.

In another alternative embodiment, also in view of reinforcing the security of the system and avoiding that the subscriber can question the request he sent to the service provider, the system comprises:
- a software means for validating the orders the subscriber placed with the service provider after detection of an encrypted audio signal issued by the card activated by the subscriber,
- a software means for issuing an acknowledgement of receipt of the orders placed, to be sent to the subscriber.

Thanks to this system, the subscriber has validated, with an electronic signature, the order he has placed with the service provider.

At least three alternative embodiments allow transmitting ID audio signals to the computer facility of the service provider.

According to the first alternative, the computer means part of the computer facility of the service providers comprises:
- a means for downloading a conversion software to the multimedia terminal, said conversion software converts, in the form of a bit sequence, the ID audio signals received through the microphone of the multimedia terminal,
- a means for issuing a bit sequence transmission order, from the multimedia terminal to the computer facilities of the service provider, via the internet-like computer network.

Consequently, the signals from the multimedia terminal appear as a bit sequence.

According to the second alternative embodiment, the multimedia terminal comprises a means for transmitting ID audio signals received through the microphone of the multimedia terminal, in the form of a sound file. This sound file is transmitted via the internet-like computer network to the computer facility of the service provider, namely upon receipt of a signal issued by the computer facilities of the service provider. In the case of this alternative, the processing of the sound file and its conversion into a bit sequence are carried out by the computer facilities of the service provider.

According to the third alternative, the system comprises conversion software to be implemented in the multimedia terminal. The conversion software converts the audio signal, received and transmitted through the microphone of the multimedia terminal, into bit sequences that can be remote transmitted by means of the internet-like computer network.

Other features and advantages of the invention will appear when reading the description of the alternative embodiments of the invention, provided by way of an illustrative and not restrictive example.

FIG. 4 shows as a block diagram the first alternative embodiment, characterized in that the computer facilities of the service provider download conversion software to the multimedia terminal.

FIG. 5 shows as a block diagram said second alternative embodiment, characterized in that the computer facilities of the service provider receive a sound file transmitted by the multimedia terminal.

FIG. 6 presents as a block diagram said third alternative embodiment, characterized in that the computer facilities of the service provider receive bits generated by the multimedia terminal by means of specific software.

Figure 1:
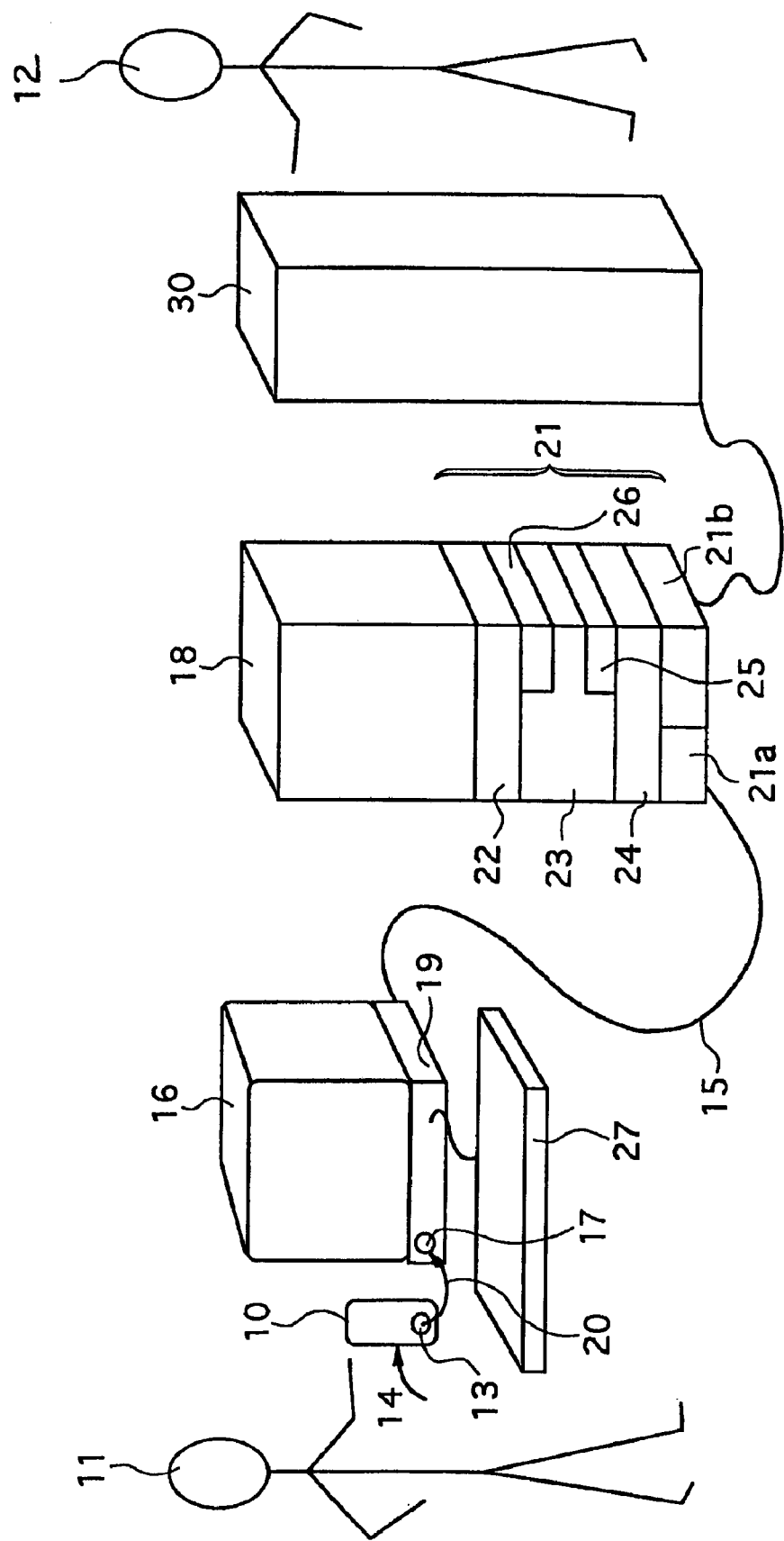
FIG. 1 shows a schematic perspective view of the system and the method according to the invention.

With reference to FIG. 1, we will now present the system and method according to the invention. The system and method according to the invention enable the users 11 of the internet-like computer network 15, who have multimedia terminals 16 with a microphone 17, to access securely and rapidly the services 30 that the service provider 12 offers to the users 11. The multimedia terminal 16, located at a distance from the computer facilities 18 of the service provider 12, is connected to the internet-like computer network 15.

The system comprises a credit-card sized card 10, customized with specific identifiers for each card and each subscriber 11. This card is supplied to the users 11 by the service provider 12 and his services 40. Card 10 comprises an issuing means, namely a loudspeaker 13 issuing short ID audio signals 20, of DTMF type. These signals are issued when the issuing means 13 and the elements that control it are activated by the customer by means of a button 14 accessible from outside the card (not visible in FIG. 1 because it is located on the other side of the card). These issuing means 13 are energized by a DTMF signal generator 99, controlled by a microprocessor 104 powered by a battery 106 and driven by a resonator 107. Microprocessor 104 contained in the card comprises an encryption means 103 allowing to encrypt, at least partially, the audio signals 20, comprising an encryption algorithm 108 and identifiers 109 specific to each card 10 and each subscriber 11, namely the secret key 250 used by the encryption algorithm 108.

Audio signals 20 are received through the microphone 17 of the handset, against which the customer places card 10. The system also comprises an audio signal 20 transmitting means 19, located inside the multimedia terminal 16. These transmission means 19 remote transmit the audio signals, when they have been processed and converted into electronic signals, via the internet-like computer network 15.

The system also comprises a computer means 21, part of the computer facilities 18 of the service provider, connected to the internet-like computer network 15 and receiving the signals from the multimedia terminals 16.

Computer means 21 comprises:
- a means for activating 22 the transmission means 19 of multimedia terminals 16,
- a database 23 containing the references of the cards and the subscribers and their ID data,
- a means for processing 24 and a means for comparing 25 the electronic signals and the ID data contained in database 23,
- ID data contained in database 23 and data characteristic for subscribers and cards.

Consequently, in case of a match, the services 30 of the service provider 12 are immediately accessible to the subscribers.

Preferably, microprocessor 104 and encryption means 103 are designed so that the audio signal 20 varies for each transaction. Indeed, encrypting an ID code means converting it into a series of data, incomprehensible to everyone, and that only the owner of the encryption key will be able to decrypt. However, by no means does this prevent the encrypted ID code from being copied, either during its audio transmission (recorder) or by pirating the telephone line. Such a copy, unduly used by a swindler, will be treated by the receiving system as having all the features of the original, but interpreted for checking the card's identifiers.

Therefore, the following problem arises: how to prevent duplication attempts? Hereinafter, we will describe various alternative embodiments of the general means which allows distinguishing the original from the copy, during the analysis of the encrypted signal received by the computer means 21, by inserting a distinctive element into the DTMF type signal issued by card 10.

One of the alternatives consists in using a function called time stamping (e.g., as described in U.S. Pat. No. 4,998, 279). This time stamping function makes use of the constantly changing "time" parameter. Thus, the "copy" turns out to be late when it is issued. Such a solution requires synchronization between the issuing means 13 and the computer means 21. For this purpose, both must have a "time base" and a "frequency standard". These two time bases have their own precision and their own drift. The result is that they are desynchronizing slowly but gradually. In view of solving this technical problem, a certain drift is tolerated between the time bases of the issuing means 13 and the computer means 21. The bigger this drift, the more the uncertainty increases regarding the "validity" of the information received and the more increases the risk of fraud. Thus, if a drift of one minute is tolerated, any unlawful copy of the encrypting signal issued and reused fraudulently within the next 30 seconds will be received as valid by the analysis system of the computer means 21.

Another alternative consists in using incremental lists (e.g., as described in U.S. Pat. No. 4,928,098). The issuing device and the receiving device have a sorted list of the successive ID code encryptions or else have algorithms enabling to create them as it goes along. At a given time, the computer means 21 are waiting for the encrypted result C(n). If they actually receive the message C(n), they validate the transaction. But the computer means 21 can receive a different message, indeed the user of the card may have activated its issuing means 13 several times, for fun, by mistake, so that the card is in the situation of issuing the encrypted result C(n+p) at its next utilization with the computer means 21. If the computer means 21 receive a different message, they search ahead in the list of successive encrypted results whether there is a message C(n+p) identical to the one received. To dispel the ambiguity "is this an authentic message issued by the originator?" or "is this a fraudulent message?", the solution consists in asking and waiting for the next message. If it is then identical to C(n+p+1), the system validates the message and starts to wait for the next message, status C(n+p+2). If it is different, the message is not validated and the analysis system continues to wait for the message C(n). Such an alternative embodiment is not very ergonomical as it obliges the card holder to activate the card several times.

According to a preferred alternative embodiment, to distinguish the original signal from its copy, the microprocessor 104 on board card 10 comprises an incremental counter 105. Each time the card is used, the incremental counter 105 increments by one or several units. Obviously, like a ratchet wheel, it cannot go backwards, it can only progress each time it is used.

Figure 2:
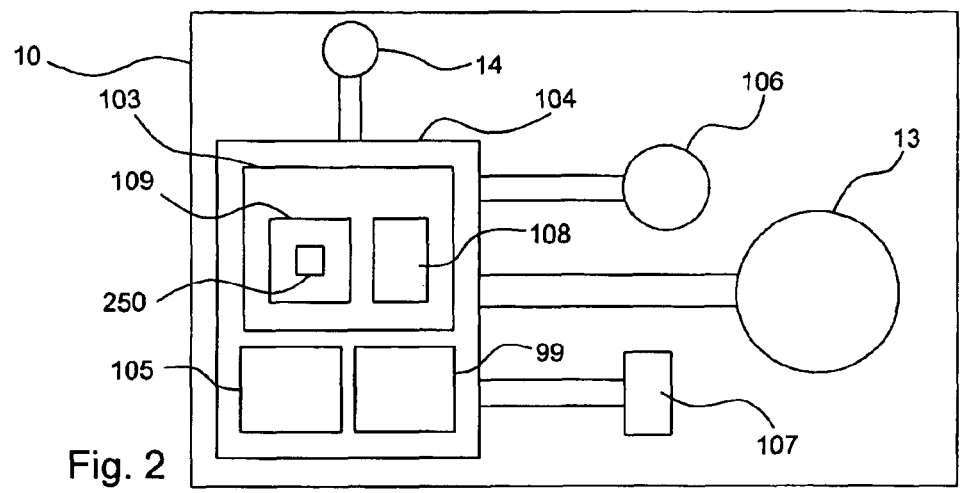
FIG. 2 shows the card in the form of a block diagram.
Figure 3:
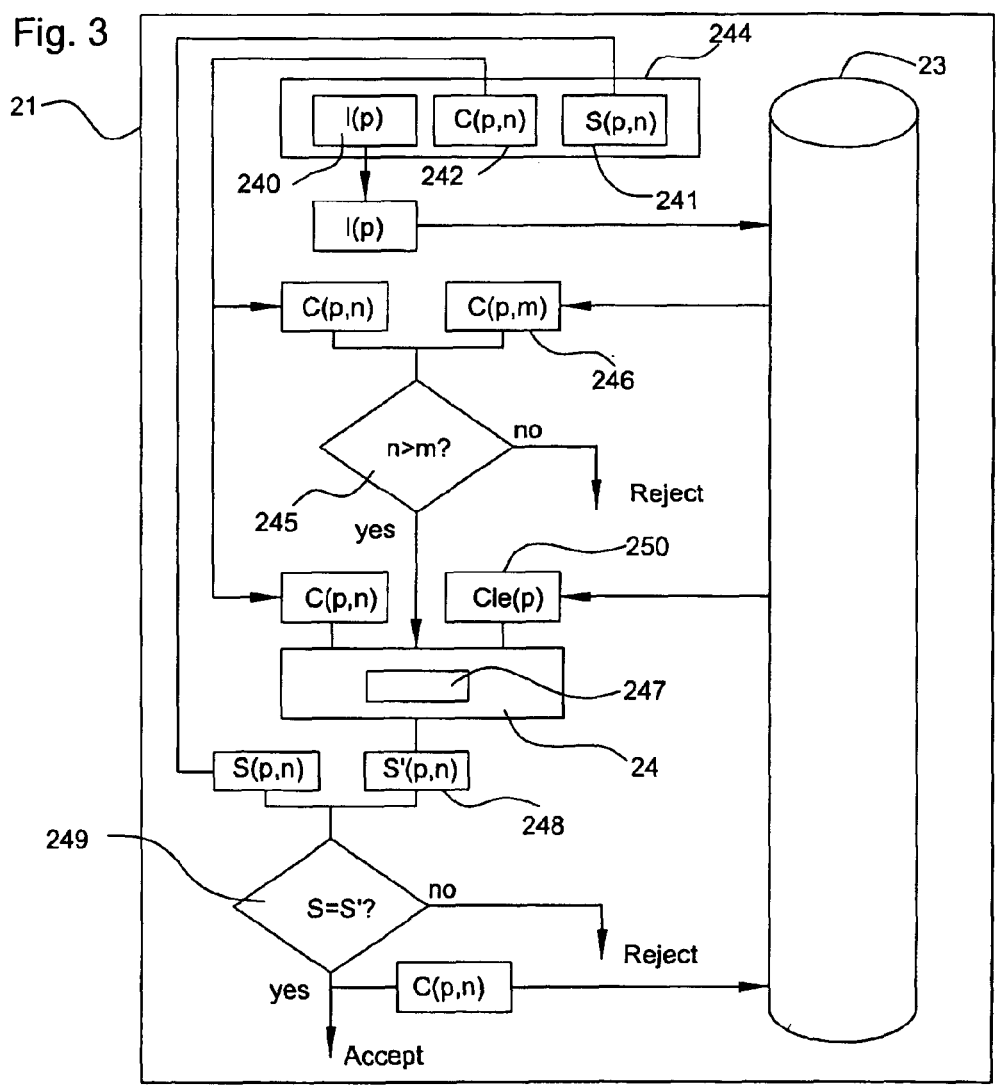
FIG. 3 shows the algorithm for verifying the authenticity of the transmitted signal.

In the case of this alternative embodiment, the status C(p,n) 242 of counter 105 is integrated into the calculation of the encrypted message 244 issued by the issuing means 13. The encoded part S(p,n) 241 is calculated by algorithm 108 (the equivalent algorithm 247 of which is stored in the computer means 21) by means of the secret key 250 specific to each card and the status C(p,n) 242 of counter 105. In addition to the ID number I(p) 240 of the card and the encrypted ID code S(p,n) 241, card 10 issues the status C(p,n) 242 of its incremental counter 105 at each issuing. Computer means 21 store 230, in database 23, the status C(p,n) 242 of the incremental counter 105 when the last transaction is validated. Thus, at each message receipt 244, the comparison means 25 of computer means 21 can compare 245 the information received concerning the status C(p,n) 242 of counter 105, to the preceding information received C(p,m) 246 and kept in memory 230, 23.

a) If the status C(p,n) 242 of counter 105 (FIG. 2) expressed in message 244 is strictly greater (n>m) than that of C(p,m) 246 received previously, then message 244 is accepted and the analysis continues.

b) If the status C(p,n) 242 of counter 105 expressed in message 244 is less than or equal (n£m) to that of C(p,m) 246 received previously, then the message is refused. The message received can only be a copy made earlier or an electronic mock-up.

If the conditions defined under item a) above are fulfilled, the computer means 21 enable to read the permanent part I(p) 240 and to search their own database 23, 230 for the secret key corresponding to the card. The calculation means 239 of the processing means 24 is then able, using algorithm 247, counter status C(p,n) 242 and secret key Clé(p) 250, to proceed to calculating the encrypted code expected by computer means 21. The encrypted code S'(p,n) 248 thus calculated is compared 249 to the one actually received S(p,n) 241, by the comparison means 25. This method and means therefore enable to validate or invalidate the message 244 without the user of the card having to activate it several times, as is the case in the alternative embodiment described above.

The fact that an incremental counter 105 exists inside card 10 enables, without extra cost, to determine at the time of individually programming the card, the maximum number of times the card can be used. Once this maximum has been reached, it no longer issues consistent messages and is therefore rejected by computer means 21.

The frame 244 issued contains, for a given card (p), a permanent part I(p) 240 (the card's ID number), an incremental variable part C(p,n) 242 (counter status), a variable part S(p,n) 241 apparently random (the result of an encryption algorithm 108 on the secret key 250 specific to this card (p)).

The frame issued always differs from one card to another, always differs, for a given card, at each issuing.

For a given card (p), computer means 21 allow:

reading the permanent part I(p) 240 (the card's ID number), searching their own database 23 for the secret key 250 of this card and the last record received of the status C(p,m) 246 of the counter 105 of this card, rejecting this frame 244 if the counter status C(p,n) 242 of the current transaction is less than or equal to that of C(p,m) 246 received previously and continuing the verification of the current transaction if the status C(p,n) 242 is strictly greater than that of C(p,m) 246 received previously, "decrypting" the message 244 received and validating its contents, recalculating by means of the encryption algorithm 247, the specific key 250 of this card and the counter status C(p,n) 242, then comparing the result of this calculation to the message received.

Thus, thanks to this combination of means it is possible to issue, by means of a credit-card sized card, ID audio frequencies of DTMF type, that can be received through the microphone of hardware linked to the telephone network, and to be sure of the authenticity of the calling card and thus dismiss all swindlers using a sound or electronic recording or any kind of electronic mock-up.

In view of increasing the security of the system, in the alternative embodiment represented in FIG. 1, the system further comprises a second comparison means 26. This comparison means enables to compare a subscriber's personal confidential code contained in the database to the confidential code issued by the subscriber. This code is issued by means of a keyboard 27 linked to the multimedia terminal 16 and/or card 10 and transmitted to the computer means of the service provider, via the computer communication network 15.

Thus, the service provider is sure that the caller 11 is actually the person authorized to get in touch with his services. A stolen card cannot be used by the thief because he does not known the confidential code.

Also in view of reinforcing the security of the system and avoiding that the subscriber can question the request he sent to the service provider, the computer means 21 (in the alternative embodiment represented in FIG. 1) comprises:

a software means 21*a* for validating the orders the subscriber placed with the service provider, after detection of an encrypted audio signal issued by the card activated by the subscriber, a software means 21*b* for issuing an acknowledgement of receipt of the orders placed, to be sent to the subscriber.

Thanks to this system, the subscriber has validated, with an electronic signature, the order he has placed with the service provider.

With reference to FIGS. 4, 5 and 6, we will now describe three alternative embodiments enabling to transmit ID audio signals 20 to the computer facility 18 of the service provider 12. The same reference numerals have been used in these figures for designating the elements and means that have been described relating to FIG. 1.

According to the first alternative embodiment (FIG. 4), the computer means 21, part of the computer facilities 18 of the service provider, comprises a means 200 for downloading to the multimedia terminal 16 a software for converting sound into bits. Consequently, the signals from the multimedia terminal 16 appear as a bit sequence.

According to the second alternative (FIG. 5), the multimedia terminal 16 comprises a means 300 for converting and transmitting ID audio signals received through the microphone of the multimedia terminal, in the form of a sound file. This sound file is namely transmitted upon receipt of a signal issued by the computer facilities 18 of the service provider. This signal is issued when the telephone connection has been established between the terminal and the computer facility. In the case of this alternative, the processing of the sound file and its conversion into a bit sequence are carried out by the computer means 21 of the computer facilities 18 of the service provider.

According to the third alternative (FIG. 6), the service provider supplies the subscriber with a conversion software (400) that the latter enters in his multimedia terminal 16. This conversion software converts the audio signals received and transmitted through the microphone 17 of multimedia terminal 16 into digital signals that can be remote transmitted by means of the internet-like computer network 15.

What is claimed is:

1. A method enabling the users (11) of a computer network, who have multimedia terminals (16) with a microphone (17) and are connected to the computer network, located at a distance from a service provider (12), to access securely and rapidly the services (30) that the service provider (12) offers to the users (11) of the computer network, said method comprising the following steps:

the service provider (12) supplies to each of the users (11) of the computer network, who have subscribed to the services, a credit-card sized card (10), customized with specific identifiers for each subscriber and each card, said credit-card sized card (10) issues short ID audio signals (20), of DTMF type, encrypted at least partially, varying for each transaction, when it is activated (14) by the user (11) of a computer network, said card (10):

further calculates (105) the number of times C(p,n) (242) that said card has been activated (14) and has issued said audio signals (20), wherein C(p,n) takes account of all activations, including activations at a wrong time, issues ID audio signals (20) representative of the number of times C(p,n) (242) that it has been activated, and encrypts (103) the ID audio signals (20) into a function S(p,n) as a function of said number of times C(p,n) (242) that said card has issued said audio signals (20) and as a function of said specific identifiers of the subscriber and the card, said ID audio signals (20) are received through the microphone (17) of the multimedia terminal (16) and transmitted via the computer network (15) to the computer facility (18) of the service provider, the signals transmitted to the computer facility (18) and the specific identifiers of the subscriber and the card, held (23) by the computer facility (18), are processed (24) and compared (25) electronically by the computer facility (18) of the service provider by computer means which:

store (230) the number of times C(p,m) (246) the card has been used at a time of a last validation operation, compare (245) the number of times C(p,n) (242) the card has been activated, at the time of the current transaction, to the number of times stored C(p,m) (246), reject the current transaction if C(p,n) (242) is less than or equal to C(p,m) (246) and continue with the verification of the current transaction if C(p,n) (242) is greater than C(p,m) (246), recalculate the ID audio signals (20) into a function S'(p,n) as a function of said number of times C(p,n) (242) that said card has issued said audio signals (20) and as a function of said specific identifiers of the subscriber and the card, and then compare S'(p,n) to S(p,n), so that in case of a match, the subscriber (11) can immediately be put through to the services (30) of the service provider (12).

2. A method according to claim 1, further comprising the following step:

the subscriber (11) transmits a confidential code using a keyboard (27) linked to the multimedia terminal (16) and/or card (10), after transmission to the computer facility (18) of the service provider (12), via the computer network (15), this confidential code is processed and compared to the subscriber's personal confidential code held (23) by the computer facility (18) of the service provider (12).

3. A method according to claim 1, further comprising the following steps:

orders the subscriber (11) placed with the services (30) of the service provider (12) are validated by the subscriber (10) activating the card (10) so that it issues an encrypted validation audio signal, said validation signal is recorded by the computer facility (18) of the service provider (12), so that the subscriber (11) has validated, with an electronic signature, the order he has placed with the service provider (12).

4. A method according to claim 1, further comprising the following step:

the ID audio signals (20), received through the microphone (17) of the multimedia terminal (16) and transmitted via the computer network (15) to the computer facility (18) of the service provider (12) are transmitted in the form of a sound file.

5. A method according to claim 1, further comprising the following steps:

the computer facility (18) of the service provider (12) downloads conversion software to the multimedia terminal, the conversion software converts, in the form of a bit sequence, the ID audio signals (20) received through the microphone (17) of the multimedia terminal (16), the bit sequence is transmitted, via the computer network (15), to the computer facility (18) of the service provider (12), so that the signals from the multimedia terminal appear as a bit sequence.

6. A method according to claim 1, further comprising the following steps:

the service provider (12) supplies to each of the users (11) of the computer network (15), who have subscribed to his services (30), conversion software to be implemented in the multimedia terminal (16), said ID audio signals (20), received through the microphone of the multimedia terminal (16) are converted into a bit sequence, before being transmitted via the computer network (15) to the computer facility (18) of the service provider.

7. A system enabling the users of a computer network (15), who have multimedia terminals (16) with a microphone (17) and are connected to the computer network, located at a distance from a service provider (12), to access securely and rapidly the services (30) that said service provider (12) offers to the subscribed users (11), said system comprising:

a credit-card sized card (10), customized with specific identifiers for each card and each subscriber, supplied to them, said card (10) comprising:

a means for issuing (13) short ID audio signals (20), of DTMF type, activated by the subscriber by means of an element (14) accessible from outside the card (10), an incremental counter (105), interconnected with the issuing means (13) and an encrypting means (103), incrementing at least by one unit as a function of the number times $C(p,n)$ (242) said element (14) has been actuated and that said card (10) has issued said audio signals (20), wherein $C(p,n)$ takes account of all activations, including activations at a wrong time, an encrypting means (103) for encrypting at least partially and varying the ID audio signals (20) into a function $S(p,n)$ as a function of said number of times $C(p,n)$ (242) that said card has issued said ID audio signals (20) and as a function of said specific identifiers of the subscriber and the card, a transmitting means (19) located inside the multimedia terminals (16), remote transmitting said ID audio signals (20) received through said microphone (17) of said multimedia terminal (16), in the form of electronic signals via the computer network (15), a computer means (21), depending on the computer facilities (18) of the service provider (12), connected to the computer network (15) and receiving the status $C(p,n)$ of said incremental counter (105) and the ID audio signals in the form of said electronic signals from the multimedia terminals (16), said computer means (21) comprising:

a database (23) containing the references of the cards (10) and the subscribers (11) and said specific identifiers of the cards and the subscribers, a means for processing (24) and a means for comparing (25) the electronic signals and the specific identifiers of the cards and the subscribers contained in the database (23), a means for storing (230) the number of times $C(p,m)$ (246) the card has been used at a time of a last validation operation, a means for comparing (245) the number of times $C(p,n)$ (242) the card has been activated, at the time of the current transaction, to the number of times stored $C(p,m)$ (246), so that verification of the current transaction is rejected if $C(p,n)$ (242) is less than or equal to $C(p,m)$ (246) and continues if $C(p,n)$ (242) is strictly greater than $C(p,m)$ (246), a means for recalculating (239), the ID audio signals (20) into a function $S'(p,n)$ as a function of said number of times $C(p,n)$ (242) that said card has issued said audio signals (20) and as a function of said specific identifiers of the subscribers and the card, a means for comparing $S'(p,n)$ to $S(p,n)$, so that in case of a match, the services (30) of the service provider (12) are immediately accessible to the subscribers (11).

8. A system according to claim 7, said computer means (21) further comprising:

a second means for comparing (26) a subscriber's personal confidential code, contained in the database (26), to a confidential code issued by the subscriber by means of a keyboard (27) linked to the multimedia terminal (16) and/or the card (10) and transmitted to the computer means (21) of the service provider (12), via the computer communication network (15).

9. A system according to claim 7, said computer means (21) further comprising:

a software means for validating (21a) orders the subscriber (11) placed with the service provider (12), after detection of an encrypted audio signal issued by the card (10) activated by the subscriber, a software means for issuing (21b) an acknowledgement of receipt of the orders placed, to be sent to the subscriber.

10. A system according to claims 7, wherein the multimedia terminal comprising a means for transmitting (300) ID audio signals (20) received through the microphone (17) of the multimedia terminal (16), in the form of a sound file, via the computer network (15) to the computer facility (18) of the service provider (12).

11. A system according to claim 7, wherein:

the computer means (21), part of the computer facilities (18) of the service provider (12), comprising:
- a means for downloading (200) conversion software to the multimedia terminal (16), said conversion software converting, in the form of a bit sequence, the ID audio signals (20) received through the microphone (17) of the multimedia terminal (16),
- a means for issuing a bit sequence transmission order, from the multimedia terminal (16) to the computer facilities (18) of the service provider, via the computer network (15), so that the signals from the multimedia terminal appear as a bit sequence.

12. A system according to claim 7, comprising:

conversion software to be implemented in the multimedia terminal (16), said conversion software converting the ID audio signals (20) received and transmitted through the microphone (17) of the multimedia terminal, into digital signals that can be remote transmitted via the computer network (15).

* * * * *